(12) United States Patent
Blackstock et al.

(10) Patent No.: US 12,172,611 B1
(45) Date of Patent: Dec. 24, 2024

(54) SYSTEMS AND METHODS FOR VEHICLE WASH SYSTEMS

(71) Applicant: Tidal Wave Systems Ltd. Co., Thomaston, GA (US)

(72) Inventors: Scott S. Blackstock, Thomaston, GA (US); Michael Dodge, Thomaston, GA (US)

(73) Assignee: Tidal Wave Systems Ltd. Co., Thomaston, GA (US)

( * ) Notice: Subject to any disclaimer, the term of this patent is extended or adjusted under 35 U.S.C. 154(b) by 0 days.

(21) Appl. No.: 18/389,920

(22) Filed: Dec. 20, 2023

(51) Int. Cl.
*B60S 3/04* (2006.01)

(52) U.S. Cl.
CPC ..................... *B60S 3/042* (2013.01)

(58) Field of Classification Search
CPC ....................................................... B60S 3/042
See application file for complete search history.

(56) References Cited

U.S. PATENT DOCUMENTS

| | | | |
|---|---|---|---|
| 2,692,214 A * | 10/1954 | Hurst | B60S 3/042 15/53.4 |
| 4,689,749 A * | 8/1987 | Glogowski | B60S 3/06 15/316.1 |
| 5,125,981 A * | 6/1992 | Belanger | B60S 3/042 134/32 |
| 2005/0279385 A1* | 12/2005 | Grier | B60S 3/04 134/123 |
| 2006/0107486 A1* | 5/2006 | Andre | B08B 3/022 15/345 |
| 2008/0178402 A1* | 7/2008 | Martines | B60S 3/06 15/53.4 |
| 2009/0272409 A1* | 11/2009 | Petit | B05B 3/14 239/548 |

\* cited by examiner

*Primary Examiner* — Marc Lorenzi
(74) *Attorney, Agent, or Firm* — Troutman Pepper Hamilton Sanders LLP; Ryan A. Schneider; Korbin M. Blunck

(57) ABSTRACT

The disclosed technology includes systems and methods for a vehicle wash system. The disclosed technology includes a vehicle wash system comprising a tire shine assembly. The tire shine assembly can be configured to transition between an extended position and a retracted position. The vehicle wash system can further include a proximity sensor configured to detect a presence of a vehicle. The vehicle wash system can be configured to, in response to the proximity sensor detecting the presence of the vehicle, cause the tire shine assembly to transition to the extended position. In response to the proximity sensor not detecting the presence of the vehicle, the vehicle wash system can cause the tire shine assembly to transition to the retracted position.

11 Claims, 4 Drawing Sheets

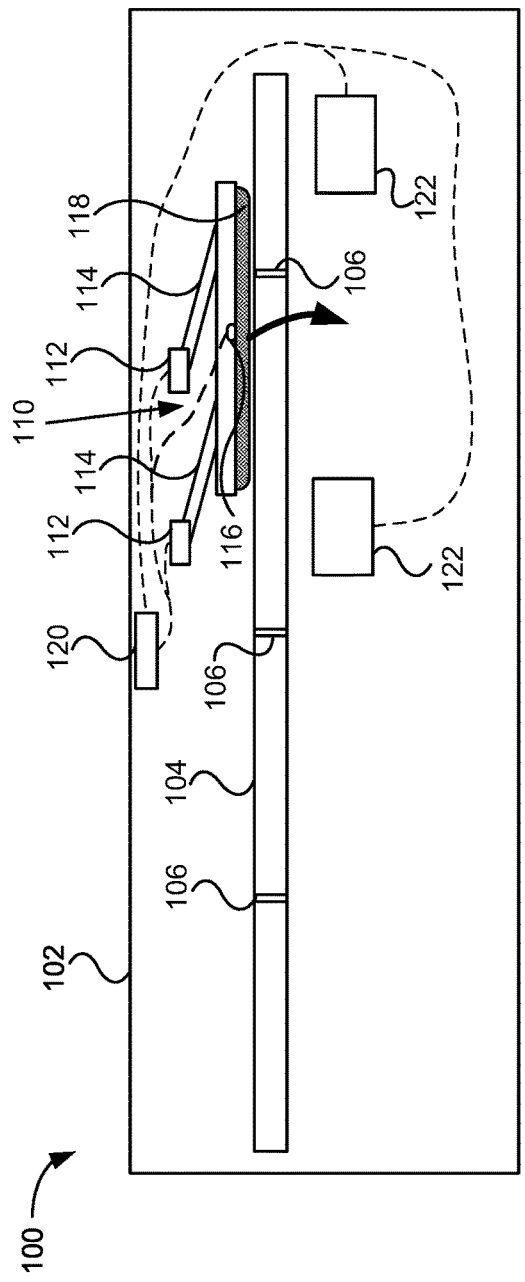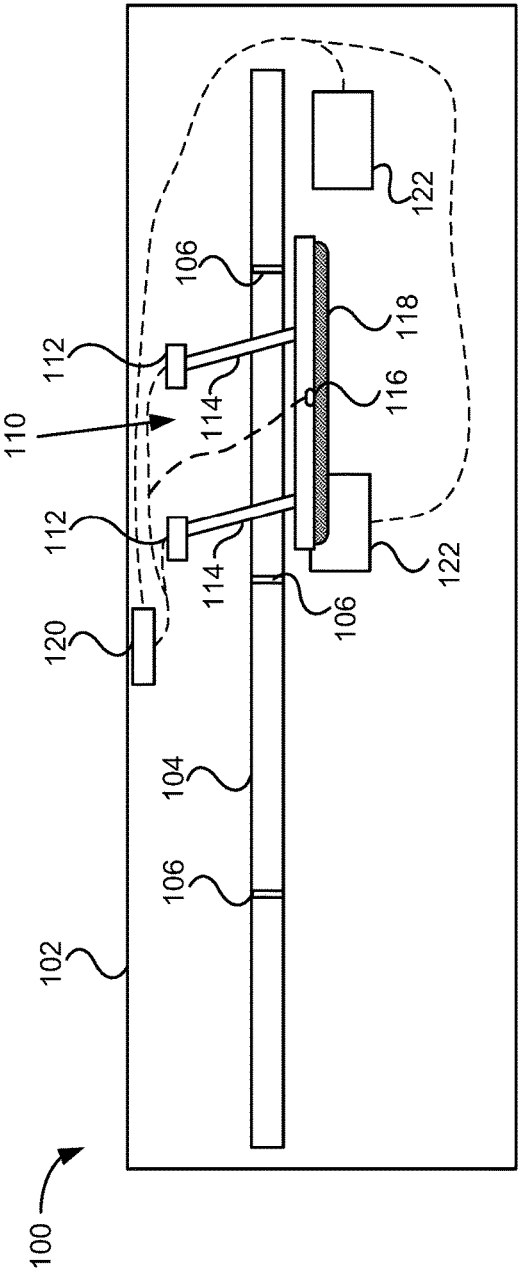
FIG. 2A
FIG. 2B

SYSTEMS AND METHODS FOR VEHICLE WASH SYSTEMS

FIELD OF TECHNOLOGY

The disclosed technology relates generally to systems and methods for vehicle wash systems and, more particularly, to systems and methods of controlling a tire shine assembly to prevent damage to vehicles and/or the vehicle wash system.

BACKGROUND

Automated vehicle wash systems are designed to wash vehicles autonomously, greatly reducing the effort needed to wash a vehicle. Many vehicle wash systems, for example, include a conveyor system that is configured to move a vehicle through the vehicle wash system at a predetermined speed while various brushes, fluid applicators or spray nozzles, and drying systems are configured to wash and dry the vehicle.

Some vehicle wash systems include subsystems that are designed to wash lower portions of the vehicle (e.g., the tires and the undercarriage). These subsystems are generally positioned below a travel path of the vehicle and/or are designed to move out of the path of the vehicle as the vehicle moves through the vehicle wash system. In some systems, the vehicle wash system includes a tire shine assembly that has a large brush configured to rotate as fluid is applied to wash and shine the tires. These tire shine assemblies are generally configured to extend outwardly from a position beside the vehicle to contact and wash and shine the tires.

Unfortunately, it is common for a person operating the vehicle to drive off the conveyor system prematurely, leaving the tire shine assembly extending outwardly into the path of a subsequent vehicle being moved through the vehicle wash system by the conveyor system. In some cases, the subsequent vehicle can be pulled over the tire shine assembly and become stuck. If this happens, a vehicle being moved through the vehicle wash system that is behind the stuck vehicle can collide with the stuck vehicle. In this scenario, both the tire shine assembly and the vehicles involved can be damaged.

What is needed, therefore, is a method and system of controlling a vehicle wash system to prevent collision of vehicles in the vehicle wash system and, in particular, to control extension and retraction of the tire shine assembly to prevent damage to the vehicles and the vehicle wash system. These and other problems are addressed by the technology disclosed herein.

SUMMARY

The disclosed technology includes a vehicle wash system comprising a tire shine assembly. The tire shine assembly can be configured to transition between an extended position and a retracted position. The vehicle wash system can further include a proximity sensor configured to detect the presence of a vehicle. The vehicle wash system can be configured to, in response to the proximity sensor detecting the presence of the vehicle, cause the tire shine assembly to transition to the extended position. The vehicle wash system can be further configured to, in response to the proximity sensor not detecting the presence of the vehicle, cause the tire shine assembly to transition to the retracted position.

The disclosed technology further includes a method of controlling a vehicle wash system. The method can include receiving a signal from a proximity sensor. The proximity sensor can be configured to detect a presence of a vehicle. In response to the signal from the proximity sensor being indicative of the vehicle being present, the method can include causing a tire shine assembly to transition to an extended position. In response to the signal from the proximity sensor being indicative of the vehicle not being present, the method can include causing a tire shine assembly to transition to a retracted position.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

FIG. 2A illustrates a plan view of a vehicle wash system with a tire shine assembly in a retracted position, in accordance with the disclosed technology.

FIG. 2B illustrates a plan view of a vehicle wash system with a tire shine assembly in an extended position, in accordance with the disclosed technology.

DETAILED DESCRIPTION

Figure 1:
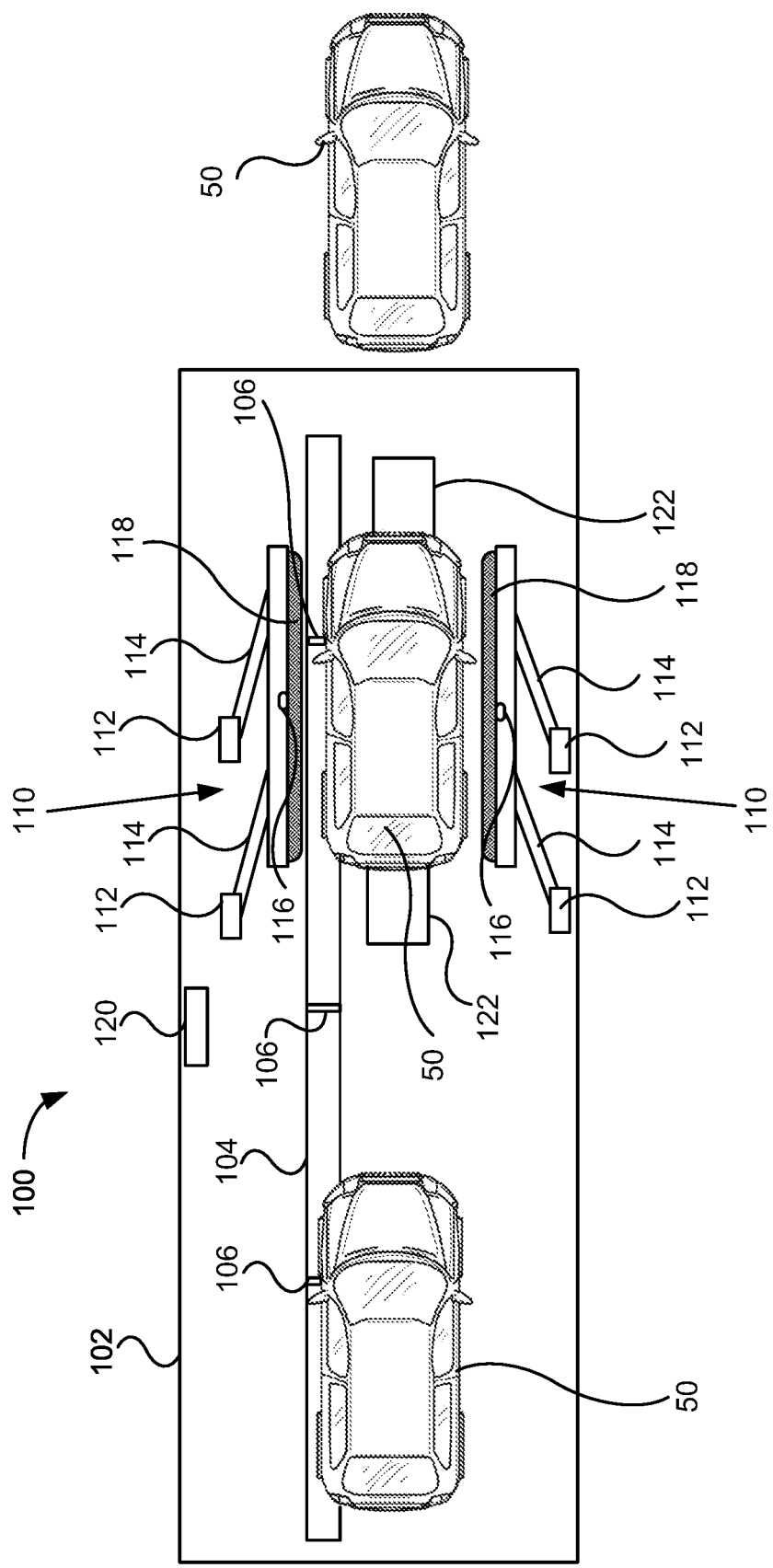
FIG. 1 illustrates a plan view of a vehicle wash system, in accordance with the disclosed technology.

The present disclosure relates generally to vehicle wash systems and, more particularly, to systems and methods of controlling a tire shine assembly to prevent damage to vehicles and/or the vehicle wash system. The disclosed technology includes a vehicle wash system that can reduce or eliminate damage to vehicles and the vehicle wash system that commonly occurs with a tire shine assembly. For example, the disclosed technology includes a proximity sensor that can detect the presence of a vehicle. The vehicle wash system can be configured to extend the tire shine assembly outwardly to wash and shine the vehicle's tires only when the vehicle is detected. When no vehicle is detected, the vehicle wash system can be configured to retract the tire shine assembly such that the tire shine assembly is moved out of a pathway of a subsequent vehicle. As will be appreciated by one of ordinary skill in the art, by moving the tire shine assembly out of the pathway of subsequent vehicles, the disclosed technology can greatly reduce the number of collisions that often occur as a result of the tire shine assembly being run over by subsequent cars. These and other features and advantages are herein described.

Although certain examples of the disclosed technology are explained in detail, it is to be understood that other examples, embodiments, and implementations of the disclosed technology are contemplated. Accordingly, it is not intended that the disclosed technology is limited in its scope to the details of construction and arrangement of components set forth in the following description or illustrated in the drawings. The disclosed technology can be implemented in a variety of examples and can be practiced or carried out in various ways.

It should be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the examples, terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the example methods and processes described herein. That is, the disclosed technology includes methods that omit one or more steps expressly discussed with respect to the examples provided herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter. Furthermore, unless explicitly stated otherwise, the various components of the described technology can be made from any suitable material including various metals, plastics, composite materials, wood, or any combination thereof. Similarly, unless explicitly stated otherwise, the various components of the described technology can be made using any suitable manufacturing process.

As used herein, the term "vehicle" refers to any type of motorized vehicle (whether electric, combustion, or hybrid power sources) such as a car, a truck, a sport utility vehicle, a tractor, an all-terrain vehicle, or other vehicles capable of being washed by a vehicle wash system. Accordingly, use of the term "vehicle" should not be construed as limited to a particular type of vehicle.

Referring now to the drawings, in which like numerals represent like elements, examples of the present disclosure are herein described. FIG. 1 illustrates a vehicle wash system 100 with vehicles 50 being moved through the vehicle wash system 100. The vehicle wash system 100 can be an automated vehicle wash system 100 that is configured to automatically wash vehicles 50 pass through the vehicle wash system 100. For simplicity in describing the disclosed technology, not all washing systems are shown in the vehicle wash system 100 but, as will be appreciated by one of ordinary skill in the art, the vehicle wash system 100 can include a plurality of brushes, mops, fluid applicators, spray nozzles, and drying systems that are each designed to wash or dry various portions of vehicles passed through the vehicle wash system 100. For example, the vehicle wash system 100 can includes a plurality of spray nozzles configured to spray water, cleaning solutions, wax, or other fluids that can wash or protect the exterior of a vehicle 50.

The vehicle wash system 100 can include a housing 102 configured to house the vehicle wash system 100 and vehicles 50 that pass through the vehicle wash system 100. The vehicle wash system 100 can further include a conveyor system 104 that can be configured to pull or otherwise cause vehicles 50 to move through the vehicle wash system 100 at a predetermined speed. The predetermined speed can be a controlled to ensure each vehicle 50 is satisfactorily washed and dried prior to exiting the vehicle wash system 100. In the example shown in FIG. 1, the conveyor system 104 can be configured to move vehicles 50 through the vehicle wash system 100 from left to right in the drawing. The conveyor system 104 can include a plurality of rollers 106 (pucks, teeth, etc.) that can engage with a vehicle 50 and move the vehicle 50 through the vehicle wash system 100.

The vehicle wash system 100 can further include a tire shine assembly 110 that can be configured to wash and shine tires of a vehicle 50. The tire shine assembly 110, for example, can include a brush 118 and a fluid applicator 116. The brush 118 can be configured to rotated and wipe dirt and grime away from the tires of the vehicle 50. The fluid applicator 116 can be configured to deliver a fluid to the brush 118 and/or the tires of the vehicle 50. The fluid delivered by the fluid applicator 116, for example, can include water and other cleaning solutions that can clean the tires of the vehicle 50 and/or solutions (e.g., an oil-based solution) configured to cause the tires to shine once applied.

The tire shine assembly 110 can further include one or more arms 114 that are connected to an actuator 112. The actuator 112 can be configured to apply a force to the arms 114 to cause the arms 114 to rotate and/or extend/contract to move the tire shine assembly 110 between a retracted position and an extended position. The actuators 112, for example, can include an electric motor, hydraulic cylinders, pneumatic cylinders, and/or other suitable actuators configured to cause the tire shine assembly 110 to transition between the extended and the retracted positions.

FIG. 2A illustrates the tire shine assembly 110 in a retracted position while FIG. 2B illustrates the tire shine assembly 110 in an extended position. For simplicity, only a single tire shine assembly 110 is shown in FIGS. 2A and 2B, but it will be appreciated that tire shine assemblies 110 on both sides of a vehicle 50 can be configured to transition between the extended and the retracted positions. In the extended position, the tire shine assembly 110 can be configured to move the brush 118 to contact the tires of a vehicle 50 to wash and shine the tires. In the retracted position, the tire shine assembly 110 can be configured to move out of a pathway of a vehicle 50 to prevent damage to the tire shine assembly 110 and/or the vehicle 50. As shown in FIG. 1, the vehicle wash system 100 can include at least two tire shine assemblies 110 such that tires on both sides of the vehicle 50 can be cleaned and shined.

The vehicle wash system 100 can further include one or more proximity sensors 122 and a control system 120. The proximity sensors 122 can be configured to detect the presence of a vehicle 50 and output a signal to the control system 120. In some examples, the proximity sensors 122 can be or include a proximity switch with a simple on or off output depending on whether a vehicle 50 is present or the proximity sensors 122 can be configured to output a signal that corresponds to a strength of signal, size of vehicle, distance between the proximity sensor 122 and/or other data relative to the detection of a vehicle 50 by the proximity sensor 122. The proximity sensors 122, for example, can be or include an inductive proximity sensor, a capacitive proximity sensor, an optical proximity sensor, a magnetic proximity sensor, an ultrasonic proximity sensor, a photoelectric proximity sensor, or other suitable type of proximity sensor configured to detect the presence of a vehicle 50.

As shown in FIGS. 2A and 2B, the control system 120 can be in communication with the proximity sensors 122, the actuators 112, the brush 118, and the fluid applicator 116 of the tire shine assembly 110. The control system 120 can either be in wired or wireless communication with each of the components just described.

In some examples, the tire shine assembly 110 can be configured to transition from the retracted to the extended position and activate the brush 118 and the fluid applicator 116 whenever the tire shine assembly 110 receives power. For instance, the proximity sensor 122 can be configured to output a signal or power to a relay that can be opened when the proximity sensor 122 does not detect the presence of a vehicle 50 and can be closed when the proximity sensor 122 detects the presence of a vehicle 50. As the proximity sensor 122 detects the presence of a vehicle 50 and causes the relay to close, the tire shine assembly 110 can receive power which will cause the actuator 112 to extend the tire shine assembly 110 outwardly to contact the vehicle 50 and also cause the brush 118 and fluid applicator 116 to activate, thereby washing and shining the tires of the vehicle 50. When the proximity sensor 122 does not detect the presence of a vehicle 50 and causes the relay to open, power can be turned off to the tire shine assembly 110 which will cause the actuator 112 to retract the tire shine assembly 110 inwardly to move out of the path of the vehicle 50 and also cause the brush 118 and fluid applicator 116 to deactivate. In some examples, the actuator 112 and/or the arms 114 can be spring-loaded to automatically move the tire shine assembly 110 out of the pathway of a vehicle 50 when power is no longer supplied to the tire shine assembly 110. As will be appreciated by one of skill in the art, various other wiring configurations can be used to cause the tire shine assembly 110 to extend and retract based on detection of the presence or absence of a vehicle 50 by the proximity sensors 122 without departing from the scope of this disclosure.

As shown in FIGS. 1-2B, the vehicle wash system 100 can include at least two proximity sensors 122 to detect the presence of a vehicle 50. This can be particularly useful, for example, to detect both large and small vehicles 50. The proximity sensors 122 can be wired in series to form a single conductive loop such that both proximity sensors 122 must detect the presence of a vehicle 50 before the tire shine assembly 110 can be transitioned to the extended state. Alternatively, the proximity sensors 122 can be wired in parallel or otherwise configured such that only a single proximity sensor 122 is necessary to detect the presence of a vehicle 50 before the tire shine assembly 110 transitions to the extended position. In other examples, the vehicle wash system 100 can be configured such that when a single proximity sensor 122 no longer detects the presence of a vehicle 50, the tire shine assembly 110 transitions to the retracted position. In still other examples, the vehicle wash system 100 can be configured such that both proximity sensors 122 must no longer detect the presence of a vehicle 50 before the tire shine assembly 110 transitions to the retracted position.

Figure 3:
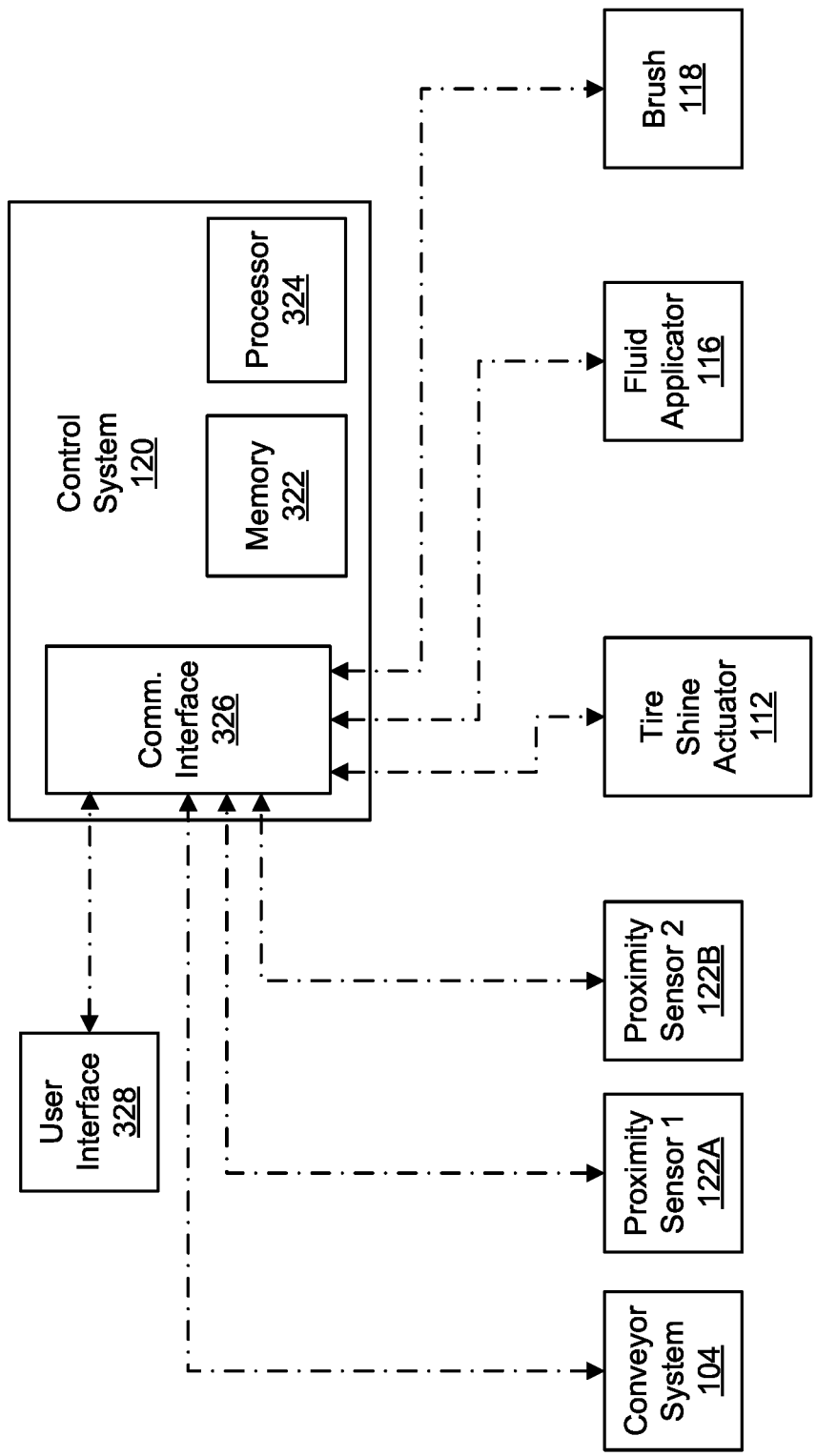
FIG. 3 is a block diagram of a vehicle wash system, in accordance with the disclosed technology.

FIG. 3 includes a block diagram of a vehicle wash system 100, in accordance with the disclosed technology. The control system 120 can have a memory 322, a processor 324, and a communication interface 326. The control system 120 can be a computing device configured to receive data, determine actions based on the received data, and output a control signal to the tire shine assembly 110 (e.g., the actuators 112, the fluid applicator 116, and/or the brush 118). One of skill in the art will appreciate that the control system 120 can be installed in any location, provided the control system 120 is in communication with the proximity sensors 122 and the tire shine assembly 110. Furthermore, the control system 120 can be configured to send and receive wireless or wired signals and the signals can be analog or digital signals. The wireless signals can include Bluetooth™, BLE, WiFi™, ZigBee™, infrared, microwave radio, or any other type of wireless communication as may be suitable for the particular application.

The control system 120 can include a memory 322 that can store a program and/or instructions associated with the functions and methods described herein and can include one or more processors 324 configured to execute the program and/or instructions. The memory 322 can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including the operating system, application programs (including, for example, a web browser application, a widget or gadget engine, and or other applications, as necessary), executable instructions and data. One, some, or all of the processing techniques or methods described herein can be implemented as a combination of executable instructions and data within the memory.

The control system 120 can also have a communication interface 326 for sending and receiving communication signals between the various components. Communication interface 326 can include hardware, firmware, and/or software that allows the processor(s) 324 to communicate with the other components via wired or wireless networks, whether local or wide area, private or public, as known in the art. Communication interface 326 can also provide access to a cellular network, the Internet, a local area network, or another wide-area network as suitable for the particular application. In this way, the vehicle wash system 100, for example, can communicate with a server or other device to receive periodic updates to the control system 120. For example, the vehicle wash system 100 can be configured to receive software updates from a server such that the vehicle wash system 100 can be remotely updated.

The communication interface 326 can be in communication with at least the conveyor system 104, the first proximity sensor 122A, the second proximity sensor 122B, a tire shine actuator 112, the fluid applicator 116 (e.g., a valve and/or pump configured to deliver fluid), the brush 118 (e.g., a motor configured to cause the brush to rotate), and/or the user interface 328.

Additionally, the control system 120 can have or be in communication with a user interface 328 for displaying system information and receiving inputs from a user. The user interface 328 can be installed locally on the vehicle wash system 100 or be a remotely controlled device such as a mobile device. A user, for example, can view settings or other data of the vehicle wash system 100 on the user interface 328 and input data or commands to the control system 120 via the user interface 328. For example, the user can view speed settings of the conveyor system 104, extension settings of the tire shine assembly 110, sensitivity settings of the proximity sensors 122, speed of rotation of the brush 118, and flow rates or timing controls of the fluid applicator 116.

The control system 120 can, for example, be configured to receive a signal from the proximity sensors 122A, 122B and determine whether a vehicle 50 is present. The control system 120, based on instructions stored in the memory 322 that can be executed by the processor 324, can be configured to determine certain actions based on whether a vehicle 50 is detected. For instance, the control system 120 can be configured to cause the tire shine assembly 110 to transition to the extended position when a vehicle 50 is detected as present and to transition to the retracted position when a vehicle 50 is not detected as present. The control system 120 can be further configured to activate the brush 118 and the fluid applicator 116 when a vehicle 50 is detected as present and to deactivate the brush 118 and the fluid applicator 116 when a vehicle is not detected as present. In other examples, the control system 120 can be configured to activate the brush 118 and/or the fluid applicator 116 for a predetermined duration when a vehicle 50 is detected as present.

The control system 120 can be further configured to determine, based on a predetermined speed of the conveyor system 104, whether a vehicle 50 is likely to be present near the tire shine assembly 110. In response to the proximity sensor 122 detecting the presence of the vehicle 50 and the control system 120 determining, based at least in part on the predetermined speed, that the vehicle 50 should not yet be present near the tire shine assembly 110, the control system 120 can cause the tire shine assembly 110 to transition to the retracted position. This can be helpful, for example, to avoid damage which can occur when a customer decides to drive away from the vehicle wash system 100 prematurely. By only causing the tire shine assembly 110 to transition to the extended position when a vehicle 50 is supposed to be present based on the predetermined speed of the conveyor system 104, the vehicle wash system 100 can ensure the tire shine assembly 110 is not extended into a pathway of a vehicle 50 when the vehicle 50 is driving through the vehicle wash system 100 and could be ran over by the vehicle 50. The control system 120 can be further configured to, in response to the proximity sensor 122 detecting the presence of a vehicle 50, cause the tire shine assembly 110 to transition to the extended position for a predetermined duration. The predetermined duration can be based at least in part on the predetermined speed of the conveyor system 104. This can be another way that the tire shine assembly 110 is extended only during a time when a vehicle 50 is likely to be present near the tire shine assembly 110, thereby reducing the likelihood that the tire shine assembly 110 is run over by a subsequent vehicle 50.

Figure 4:
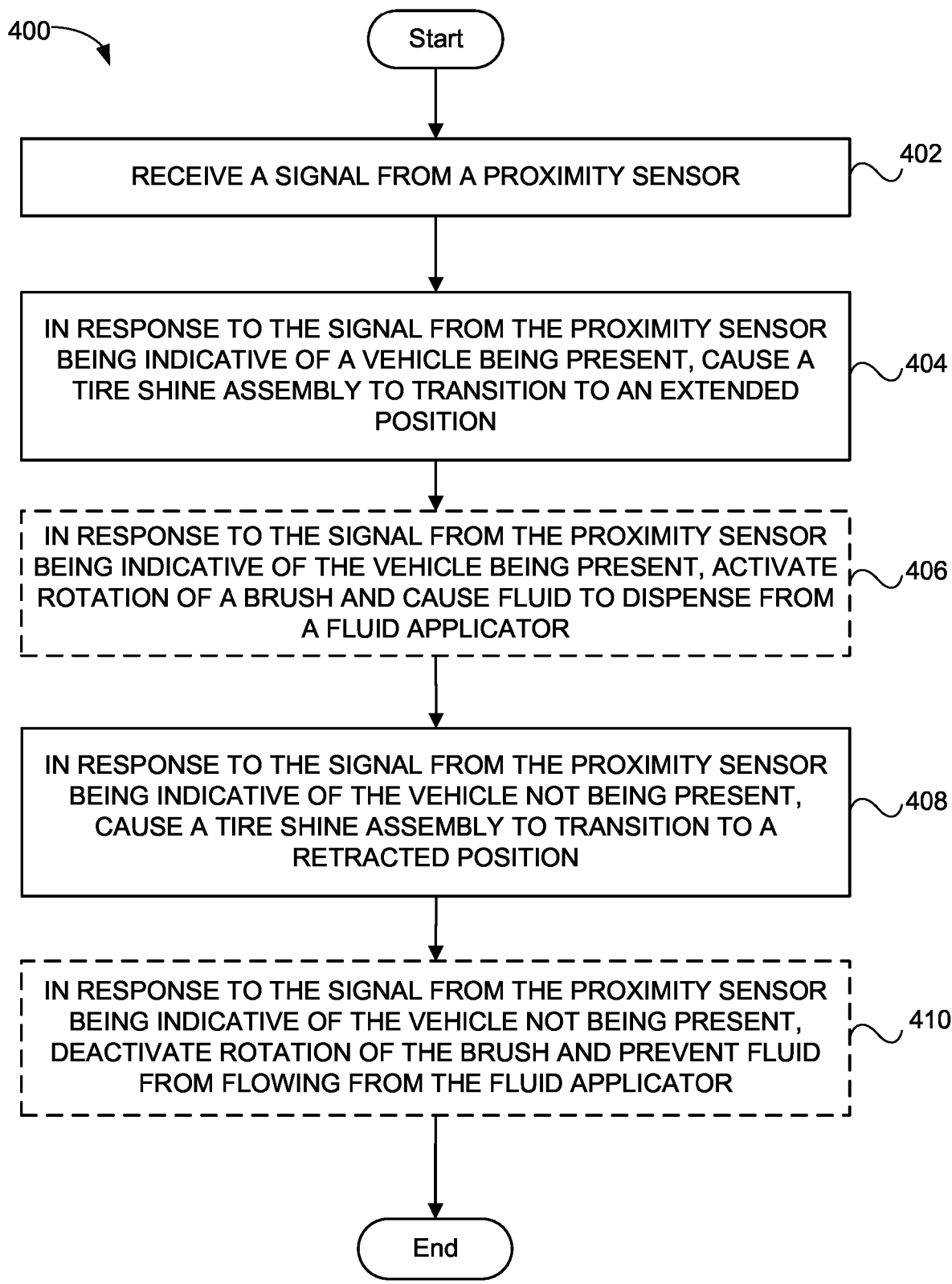
FIG. 4 is a flow chart of a method of operating a vehicle wash system, in accordance with the disclosed technology.

The disclosed technology can further include a method of controlling a vehicle wash system 100. As shown in FIG. 4, the method 400 can include receiving 402 a signal from a proximity sensor. In response to the signal from the proximity sensor being indicative of a vehicle being present, the method 400 can include causing 404 a tire shine assembly to transition to an extended position. The method 400 can optionally include, in response to the signal from the proximity sensor being indicative of a vehicle being present, activating 406 rotation of a brush and causing fluid to dispense from a fluid applicator.

In response to the signal from the proximity sensor being indicative of the vehicle not being present, the method 400 can include causing a tire shine assembly to transition to a retracted position. The method 400 can optionally include, in response to the signal from the proximity sensor being indicative of the vehicle not being present, deactivating 410 rotation of the brush and preventing fluid from flowing from the fluid applicator.

As will be appreciated, the method 400 just described and other methods described herein can be varied in accordance with the various elements and examples described herein. That is, methods in accordance with the disclosed technology can include all or some of the steps described above and/or can include additional steps not expressly disclosed above. Further, methods in accordance with the disclosed technology can include some, but not all, of a particular step described above. Further still, various methods described herein can be combined in full or in part. That is, methods in accordance with the disclosed technology can include at least some elements or steps of a first method and at least some elements or steps of a second method. Moreover, the methods described herein, or portions thereof, can be embodied in computer instructions (e.g., in a non-transitory, computer readable medium).

The disclosed technology can be further understood according to the following clauses:

Clause 1: A vehicle wash system comprising: a tire shine assembly, the tire shine assembly configured to transition between an extended position and a retracted position; a proximity sensor configured to detect a presence of a vehicle, the vehicle wash system configured to: in response to the proximity sensor detecting the presence of the vehicle, cause the tire shine assembly to transition to the extended position; and in response to the proximity sensor not detecting the presence of the vehicle, cause the tire shine assembly to transition to the retracted position.

Clause 2: The vehicle was system of claim 1, wherein the tire shine assembly comprises a brush and a fluid applicator.

Clause 3: The vehicle wash system of claim 2, wherein the vehicle wash system is further configured to: in response to the proximity sensor detecting the presence of the vehicle, activate rotation of the brush and cause fluid to dispense from the fluid applicator; and in response to the proximity sensor not detecting the presence of the vehicle, deactivate rotation of the brush and prevent fluid from flowing from the fluid applicator.

Clause 4: The vehicle wash system of claim 3, wherein the vehicle wash system is further configured to, in response to the proximity sensor detecting the presence of the vehicle, activate rotation of the brush and cause fluid to dispense from the fluid applicator for a predetermined duration.

Clause 5: The vehicle wash system of claim 1, wherein the proximity sensor comprises an inductive proximity sensor.

Clause 6: The vehicle was system of claim 1, wherein, when the proximity sensor detects the presence of a vehicle, the proximity sensor is configured to close an electrical circuit to provide power to the tire shine assembly, and wherein when the proximity sensor does not detect the presence of a vehicle, the proximity sensor is configured to open an electrical circuit to prevent power from being supplied to the tire shine assembly.

Clause 7: The vehicle wash system of claim 1, wherein the proximity sensor comprises a first proximity sensor, the vehicle wash system further comprising a second proximity sensor.

Clause 8: The vehicle wash system of claim 7, wherein the first proximity sensor and the second proximity sensor are electrically connected in series to create a single conductive loop.

Clause 9: The vehicle wash system of claim 7, wherein the vehicle wash system is further configured to: in response to the first proximity sensor and the second proximity sensor both detecting the presence of the vehicle, cause the tire shine assembly to transition to the extended position; and in response to the first proximity sensor and the second proximity sensor both not detecting the presence of the vehicle, cause the tire shine assembly to transition to the retracted position.

Clause 10: The vehicle wash system of claim 7, wherein the vehicle wash system is further configured to, in response to at least one of the first proximity sensor and the second proximity sensor detecting the presence of the vehicle, cause the tire shine assembly to transition to the extended position.

Clause 11: The vehicle wash system of claim 7, wherein the vehicle wash system is further configured to, in response to at least one of the first proximity sensor and the second proximity sensor not detecting the presence of the vehicle, cause the tire shine assembly to transition to the retracted position.

Clause 12: The vehicle wash system of claim 1, further comprising a conveyor system configured to cause the vehicle to move along a length of the vehicle wash system at a predetermined speed.

Clause 13: The vehicle wash system of claim 12, the vehicle wash system is further configured to: determine, based at least in part on the predetermined speed of the conveyor system, whether the vehicle is likely to be present near the tire shine assembly, and in response to the proximity sensor detecting the presence of the vehicle and the vehicle wash system determining, based at least in part on the predetermined speed, that the vehicle should not yet be present near the tire shine assembly, cause the tire shine assembly to transition to the retracted position.

Clause 14: The vehicle wash system of claim 12, wherein the vehicle wash system is further configured to, in response the proximity sensor detecting the presence of the vehicle, cause the tire shine assembly to transition to the extended position for a predetermined duration, the predetermined duration being based at least in part on the predetermined speed of the conveyor system.

Clause 15: A method of controlling a vehicle wash system, the method comprising: receiving a signal from a proximity sensor, the proximity sensor configured to detect a presence of a vehicle; in response to the signal from the proximity sensor being indicative of the vehicle being present, causing a tire shine assembly to transition to an extended position; and in response to the signal from the proximity sensor being indicative of the vehicle not being present, causing a tire shine assembly to transition to a retracted position.

Clause 16: The method of claim 15, further comprising: in response to the signal from the proximity sensor being indicative of the vehicle being present, activating rotation of a brush and cause fluid to dispense from a fluid applicator; and in response to the signal from the proximity sensor being indicative of the vehicle not being present, deactivating rotation of the brush and preventing fluid from flowing from the fluid applicator.

Clause 17: The method of claim 16, further comprising: in response to the signal from the proximity sensor being indicative of the vehicle being present, activate rotation of a brush and cause fluid to dispense from a fluid applicator for a predetermined duration.

Clause 18: The method of claim 15 further comprising causing a vehicle to move along a conveyor system at a predetermined speed.

Clause 19: The method of claim 18 further comprising: determining, based at least in part on the predetermined speed of the conveyor system, whether the vehicle is likely to be present near the tire shine assembly, and in response to the signal from the proximity sensor being indicative of the vehicle being present and determining, based at least in part on the predetermined speed, that the vehicle should not yet be present near the tire shine assembly, causing the tire shine assembly to transition to the retracted position.

Clause 20: The method of claim 18, further comprising, in response the signal from the proximity sensor being indicative of a vehicle being present, causing the tire shine assembly to transition to the extended position for a predetermined duration, the predetermined duration being based at least in part on the predetermined speed of the conveyor system.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. But other equivalent methods or composition to these described aspects are also contemplated by the teachings herein. Therefore, the present disclosure should not be limited to any single aspect, but rather construed in breadth and scope in accordance with the appended claims.

What is claimed is:

1. A vehicle wash system comprising:
   a conveyor system configured to cause a vehicle to move along a length of the vehicle wash system at a predetermined speed;
   a tire shine assembly comprising:
      a brush configured to transition between an extended position and a retracted position; and
      a fluid applicator configured to apply a fluid to at least one of the brush or a vehicle tire;
   a proximity sensor configured to detect a presence of a vehicle;
   one or more processors; and
   a memory storing instructions that, when executed by the one or more processors, are configured to cause the vehicle wash system to:
      determine, based at least in part on the predetermined speed of the conveyor system, whether the vehicle should be present proximate the tire shine assembly;
      in response to the proximity sensor detecting the presence of the vehicle and the vehicle wash system determining, based at least in part on the predetermined speed, that the vehicle should be present proximate the tire shine assembly, cause the brush to transition to the extended position;
      in response to the proximity sensor detecting the presence of the vehicle and the vehicle wash system determining, based at least in part on the predetermined speed, that the vehicle should not yet be present proximate the tire shine assembly, cause the brush to transition to the retracted position; and in response to the proximity sensor not detecting the presence of the vehicle, cause the brush to transition to the retracted position.

2. The vehicle wash system of claim 1, wherein the vehicle wash system is further configured to:

in response to the proximity sensor detecting the presence of the vehicle, activate rotation of the brush and cause fluid to dispense from the fluid applicator; and in response to the proximity sensor not detecting the presence of the vehicle, deactivate rotation of the brush and prevent fluid from flowing from the fluid applicator.

3. The vehicle wash system of claim 2, wherein the vehicle wash system is further configured to, in response to the proximity sensor detecting the presence of the vehicle, activate rotation of the brush and cause fluid to dispense from the fluid applicator for a predetermined duration.

4. The vehicle wash system of claim 1, wherein the proximity sensor comprises an inductive proximity sensor.

5. The vehicle wash system of claim 1, wherein when the proximity sensor detects the presence of a vehicle, the proximity sensor is configured to close an electrical circuit to provide power to the tire shine assembly, and wherein when the proximity sensor does not detect the presence of a vehicle, the proximity sensor is configured to open an electrical circuit to prevent power from being supplied to the tire shine assembly.

6. The vehicle wash system of claim 1, wherein the proximity sensor comprises a first proximity sensor, the vehicle wash system further comprising a second proximity sensor configured to detect the presence of the vehicle.

7. The vehicle wash system of claim 6, wherein the first proximity sensor and the second proximity sensor are electrically connected in series to create a single conductive loop.

8. The vehicle wash system of claim 6, wherein the vehicle wash system is further configured to:

in response to the first proximity sensor and the second proximity sensor both detecting the presence of the vehicle, cause the brush to transition to the extended position; and in response to the first proximity sensor and the second proximity sensor both not detecting the presence of the vehicle, cause the brush to transition to the retracted position.

9. The vehicle wash system of claim 6, wherein the vehicle wash system is further configured to, in response to at least one of the first proximity sensor and the second proximity sensor detecting the presence of the vehicle, cause the brush to transition to the extended position.

10. The vehicle wash system of claim 6, wherein the vehicle wash system is further configured to, in response to at least one of the first proximity sensor and the second proximity sensor not detecting the presence of the vehicle, cause the brush to transition to the retracted position.

11. The vehicle wash system of claim 1, wherein the vehicle wash system is further configured to, in response the proximity sensor detecting the presence of the vehicle, cause the brush to transition to the extended position for a predetermined duration, the predetermined duration being based at least in part on the predetermined speed of the conveyor system.

* * * * *